April 6, 1943.  R. H. CRAMER  2,315,937

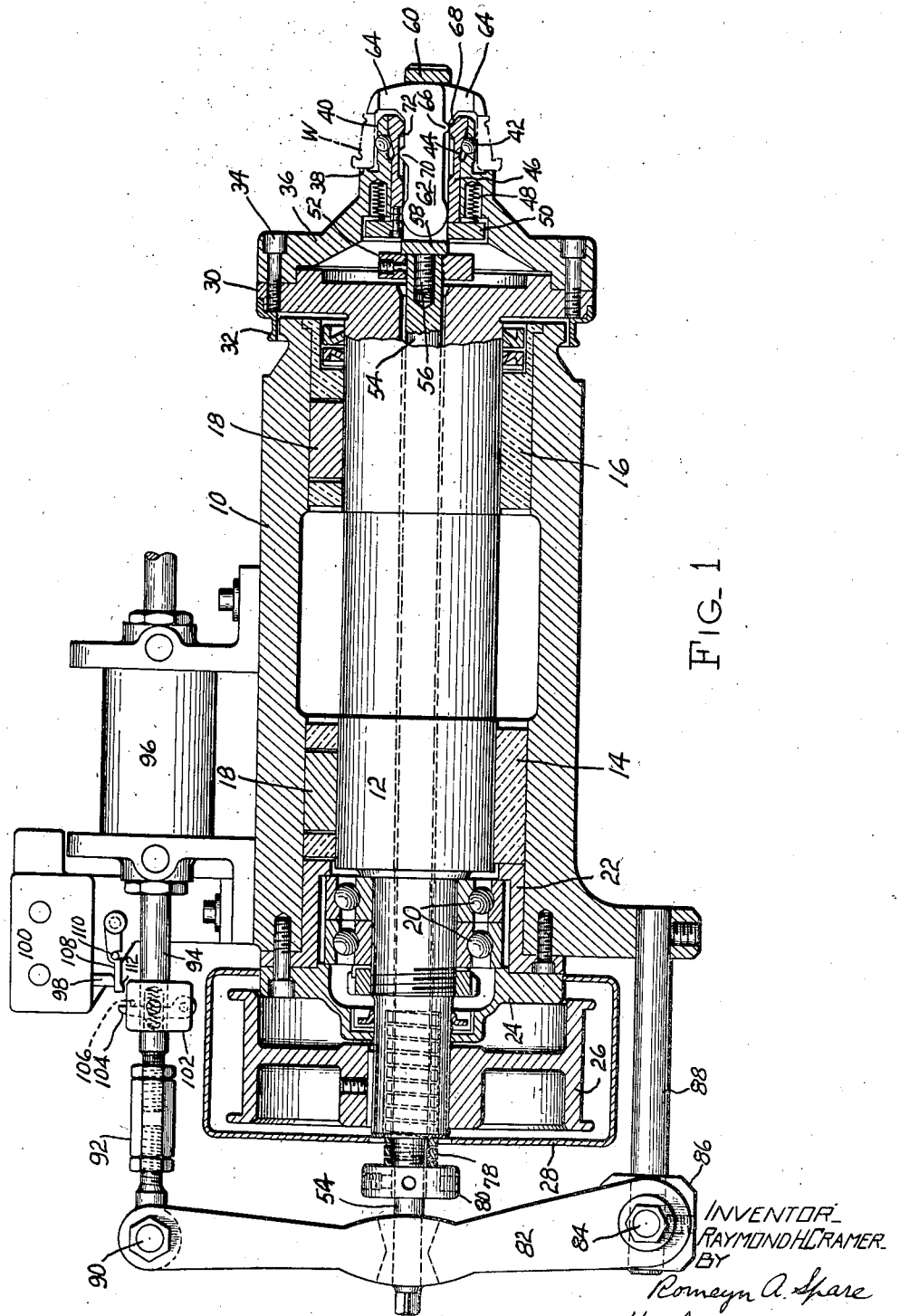

CHUCKING MECHANISM

Original Filed July 30, 1940   2 Sheets-Sheet 2

INVENTOR
RAYMOND H. CRAMER
BY
Romeyn A. Spare
HIS ATTORNEY

Patented Apr. 6, 1943

2,315,937

UNITED STATES PATENT OFFICE 2,315,937

CHUCKING MECHANISM

Raymond H. Cramer, Newark, N. J., assignor to General Motors Corporation, Detroit, Mich., a corporation of Delaware Original application July 30, 1940, Serial No. 348,398. Divided and this application March 13, 1941, Serial No. 383,199

13 Claims. (Cl. 279—107)

This invention relates to chucking mechanism and comprises all of the features and aspects of novelty herein disclosed. An object of the invention is to provide an improved chuck more especially for clamping a hollow work-piece for a machining operation on an exterior face. Another object is to provide improved centering mechanism for centering the work prior to clamping. Another object is to provide a chuck in which the parts are extremely compact and operate to center and firmly grip the work in a reliable manner.

To these ends and also to improve generally upon devices of this character, the invention consists in the various matters hereinafter described and claimed. In its broader aspects, the invention is not necessarily limited to the specific construction selected for illustrative purposes in the accompanying drawings in which Fig. 1 is chiefly a horizontal axial section of a work head.

Figure 3:
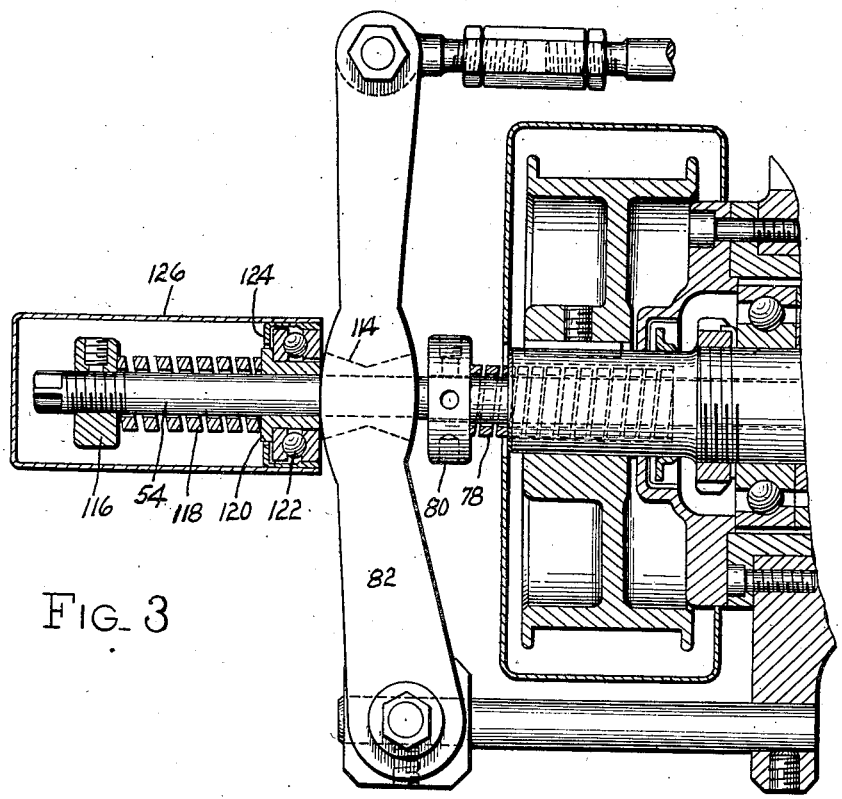
Fig. 3 is a view similar to Fig. 1 of a modification.

This application is a division of my copending application Serial Number 348,398 filed July 30, 1940.

The work head comprises a housing 10 in which a hollow spindle 12 is journalled for rotation by bearing sleeves 14 and 16 having bearing inserts 18. Endwise movement of the spindle is prevented by a pair of preloaded ball bearings 20 arranged back to back, the inner race rings being clamped on the spindle by a nut and the outer race rings being clamped between a flange on a bearing housing 22 and a dished cap 24. The spindle is driven by a belt pulley 26 enclosed within a guard 28. At the chuck end, the spindle has a flange 30 carrying a water slinger 32 lapping over a drain groove on the housing.

Fastened to the flange 30 by bolts 34 is a chuck body 36 having an abutment face 38 to abut against one end of the work piece W, and beyond the face 38 is a circular seat or nose portion 40 to loosely enter the work. The nose portion has a plurality of openings (preferably three) to loosely receive centering balls 42 which engage inclines 44 in longitudinal grooves on the exterior of a centering sleeve 46 which is slidable within the chuck. The sleeve is urged to centering position by coil springs 48 engaging a thrust plate 50 fastened by screws to the inner end of the sleeve. The sleeve is adapted to be moved out of centering position by a collar or adjusting nut 52 on a draw rod 54 when the latter is moved outwardly to work releasing position.

Figure 2:
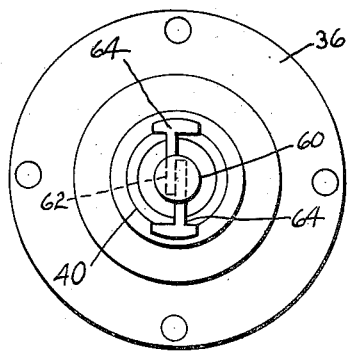
Fig. 2 is an end view of the chuck.

A round bar which is diametrically slotted is removably attached to the end of the draw rod by a threaded stud 56, the slot extending lengthwise nearly for the full length of the bar and so leaving unbroken end walls 58 and 60. Fitting side by side in the slot is a pair of flat sided shanks 62 carrying outwardly projecting clamping fingers 64, the latter having their ends extended laterally as indicated in Fig. 2 and so adapted to clamp against an ample area at the outer end of the work W. The work W is herein shown as the inner race ring of a tapered roller bearing. The shanks 62 have rounded inner ends engaging the interior of the centering sleeve 46 to freely rock therein into clamping position when little lugs 66 on the shanks run along an inclined cam surface 68 at the end of the sleeve, as when the draw rod is pulled inwardly. Another lug 70 on each shank enters a recess in the sleeve and is adapted to engage an inclined cam surface 72 to release the clamping fingers when the draw rod is moved outwardly. The end walls 58 and 60 compel the clamping members to move with the slotted bar when the latter is moved endwise by the draw rod but there is some lost motion. To swing freely, the shanks are rounded at their outer ends where they engage the wall 60. There is a lost motion space between the nut 52 and the thrust plate 50 so that the fingers release the work before the centering balls 42 release it. When chucking, the nut 52 releases the thrust plate 50 and sleeve 46 at once so that the balls center the work before the fingers grip it.

The draw rod 54 rotates with the hollow spindle 12 and its chuck and is always urged towards clamping position by a spring 78 interposed between an adjusting nut 80 on the draw rod and a shoulder at the bottom of a counterbore in the spindle. The draw rod can be forced outwardly to the right by a lever 82 pivoted at 84 to a fulcrum block 86 fastened to a supporting bar 88 on the work head. The free end of the lever has an oversize hole for a pivot pin 90 by which it is pivotally connected to a turnbuckle 92, the turnbuckle being connected to a piston rod 90 projecting from an operating cylinder 96. The piston rod swings the lever 82 to cause a rounded surface on the lever to engage the nut 80 and shift the draw rod outwardly to work releasing position. The movement of the piston rod in one direction also operates the plunger 98 of a switch in a switch box 100. To effect this action, a block 102 is clamped to the piston rod and carries a pivoted dog 104 which is urged towards a stop pin 106 by a light coil spring. When the piston rod moves to the right, the dog will swing away from the stop pin and ride idly along a pivoted lever 108. The lever is urged towards a stop pin 110 by the switch plunger 98. When the piston rod moves to the left, the dog cannot swing beyond its stop pin 106 so that it positively engages a cam incline 112 on the lever 108 and operates the switch. The switch operates devices not shown, such as a solenoid which reverses a valve controlling the action of a work loading cylinder so that chucking will be timed with the loading operation.

Figure 3 indicates a modification whereby greater spring pressure can be applied to the draw rod to supplement the spring 78. The draw rod 54 is extended through a double tapered hole 114 in the lever 82 and is threaded to receive an adjusting nut 116. A coil spring 118 is interposed between the nut and a flanged sleeve 120 through which the draw rod can slide. The sleeve 120 carries a ball thrust bearing 122 one race ring of which bears against the flange of the sleeve and the other race ring bearing against a rounded surface on the lever 82, the sleeve clearing the lever by reason of its tapering hole 114. The thrust bearing has a casing 124 supporting a shield 126 which encloses the spring and associated elements. As described in the parent case, this auxiliary spring pressure may be omitted as shown in Fig. 1.

I claim:

1. In a device of the character indicated, a chuck, a hollow spindle for rotating the chuck, a draw bar slidable within the spindle, a diametrically slotted bar connected to the draw bar and having end walls, angular clamping fingers having shanks fitting side by side within and extending lengthwise of the slot from one end wall substantially to the other for axial shifting thereby, and a cam face for swinging the fingers against a work-piece upon shifting movement of the draw bar with the shanks.

2. In a device of the character indicated, a chuck, a hollow spindle for rotating the chuck, a draw bar slidable within the spindle, a slotted bar within the chuck and connected to the draw bar, clamping fingers having shanks fitting side by side in the slot and extending from one end of the slot substantially to the other, a cam face surrounding the shanks, and means for actuating the draw bar to move the shanks along the surrounding cam face and thereby cause the fingers to clamp a work-piece.

3. In a device of the character indicated, a chuck, a slotted bar within the chuck and movable axially thereof, clamping fingers having shanks received in the slot, the shanks having rounded ends and being rockable in the slot upon said rounded ends, lugs on the shanks, a cam face surrounding the shanks and lying in the path of the lugs, the slotted bar having an outer end wall retaining the shanks, and means for shifting the slotted bar to force the end wall against the outer ends of the shanks to shift the shanks axially and thereby cause the lugs to engage the cam face.

4. In a device of the character indicated, a chuck, a slotted bar within the chuck and movable axially thereof, the slotted bar having an outer end wall, rockable clamping fingers having shanks extending lengthwise of the slot and up to said outer end wall, a sleeve surrounding the shanks and the slotted bar, the sleeve having a cam face, the fingers projecting outwardly from the shanks, and means for shifting the slotted bar to force the end wall against the outer ends of the shanks to shift the latter axially within the sleeve and thereby cause the cam face to react on other portions of the shanks and actuate the clamping fingers.

5. In a device of the character indicated, a chuck having a hollow nose provided with openings, centering balls within the openings, a sleeve shiftable within the nose and having cam faces engaging the balls, angular work clamping members having actuating mechanism passing through the sleeve, a thrust plate secured to the sleeve, a spring engaging the thrust plate to shift the sleeve within the nose, and means for controlling the actuation of the thrust plate and the angular clamping members in succession.

6. In a device of the character indicated, a chuck having a hollow nose provided with openings, centering balls within the openings, a sleeve shiftable within the nose and having cam faces engaging the balls, a thrust plate secured to the sleeve, a spring engaging one side of the thrust plate, and a member shiftable axially of the chuck to engage the other side of the thrust plate.

7. In a device of the character indicated, a chuck having a hollow nose provided with openings, centering balls within the openings, a sleeve shiftable within the nose and having cam faces engaging the balls, a slotted bar slidable within the sleeve, clamping fingers having shanks rockably mounted in the slot, and means for successively expanding the centering balls and swinging the clamping fingers against a work-piece.

8. In a machine of the character indicated, a chuck having a hollow nose to receive a work-piece, radially movable centering means having an actuating sleeve slidable axially within the nose, a slotted bar slidable axially within the sleeve, shanks fitting side by side within the slot and having rounded ends to rock within the sleeve, clamping fingers projecting from the shanks across the end of the nose, and means for axially sliding the sleeve and the slotted bar to center the work-piece and clamp it.

9. In a machine of the character indicated, a chuck having a hollow nose to project into a hollow work-piece, an abutment for one end of the works-piece, means comprising members movable radially through the nose for centering the work-piece thereon, clamping members having shanks within the nose and having projecting clamping fingers to engage the opposite end of the work-piece, and means for causing the centering members to move radially and center the work-piece prior to the action of the clamping members.

10. In a machine of the character indicated, a chuck having a hollow nose to project loosely into a hollow work-piece, radially movable centering means having an actuating sleeve slidable within the nose for centering the work-piece thereon, clamping members extending through the sleeve and having fingers projecting beyond the end of the nose, and means for successively actuating the centering means and the clamping members.

11. In a machine of the character indicated, a chuck having an abutment for one end of a work-piece, the chuck having a portion projecting beyond the abutment and provided with openings, centering members movable radially within the openings, a slidable sleeve having cams for radially moving the centering members, and clamping fingers for holding the work-piece against the abutment.

12. In a machine of the character indicated, a chuck having a hollow nose to project into a hollow work-piece, an abutment for one end of the work-piece, clamping members having shanks inside of the nose and fingers projecting outwardly of the shanks, the fingers being extended arcuately with respect to the work-piece to cover extended areas thereof, a cam outside of the shanks, and means for shifting the shanks endwise into co-operative engagement with the cam for rocking the clamping members to cause said fingers to engage the other end of the work-piece.

13. In a device of the character described, a chuck, a diametrically slotted bar shiftable axially of the chuck and having end walls defining the ends of the slot, angular clamping members having shanks rockable within the slot and extending from one end wall substantially to the other to provide for axial shifting movement of the shanks in opposite directions with the bar, and cam faces surrounding the shanks and acting upon said axial shifting movement to rock said clamping members with respect to the work-piece.

RAYMOND H. CRAMER.